United States Patent [19]

Farrell

[11] 4,098,857
[45] Jul. 4, 1978

[54] METHOD FOR MAKING BLOW MOLDED CONTAINERS WITH HIGH LENGTH TO DIAMETER RATIO

[75] Inventor: John J. Farrell, Greenbrook, N.J.

[73] Assignee: Farrell Patent Company, Greenbrook, N.J.

[21] Appl. No.: 653,230

[22] Filed: Jan. 28, 1976

Related U.S. Application Data

[62] Division of Ser. No. 512,294, Oct. 4, 1974, Pat. No. 3,936,260.

[51] Int. Cl.² ............................................. B29C 17/07
[52] U.S. Cl. ......................................... 264/89; 264/97
[58] Field of Search ...................... 264/89, 90, 92, 94, 264/96–99; 425/242 B, 387 B, DIG. 209, DIG. 215, DIG. 216

[56] References Cited

U.S. PATENT DOCUMENTS

| | | | |
|---|---|---|---|
| 3,470,282 | 9/1969 | Scalora | 264/97 |
| 3,761,550 | 9/1973 | Seefluth | 264/98 X |
| 3,849,530 | 11/1974 | Wyeth et al. | 264/89 |
| 3,972,976 | 8/1976 | Farrell | 264/97 X |

*Primary Examiner*—Jan H. Silbaugh
*Attorney, Agent, or Firm*—Marvin Feldman; Stephen E. Feldman

[57] ABSTRACT

This invention increases the length-to-diameter ratio of plastic articles made on injection molding machines without using long and relatively thin core rods. This added length is obtained by having the first part of the blowing operation stretch the parison lengthwise before there is any substantial displacement of the parison in a radial direction. At the start of the blowing operation, a tube surrounds and confines radial expansion of the parison, but this tube is withdrawn progressively as the blowing operation continues.

11 Claims, 6 Drawing Figures

METHOD FOR MAKING BLOW MOLDED CONTAINERS WITH HIGH LENGTH TO DIAMETER RATIO

This application is a divisional application of copending application U.S. Ser. No. 512,294, filed Oct. 4, 1974 now U.S. Pat. No. 3,936,260.

One of the difficulties in making containers on injection blow molding machines is that there are limitations on the length of the container with respect to its diameter or cross section. One way to increase the length-to-diameter ratio is to use longer core rods but this has the disadvantage that the long core rods do not have the stability of shorter ones and increasing the cross section of the core rod makes it unusable on conventional machines.

This invention uses a different expedient for increasing the length-to-diameter ratio without changing the core rods. A novel blowing mold is used which causes the parison to be blown first in a lengthwise direction and then to the full cross section of the blow mold cavity. This differential blowing action is obtained by having a tube which fits into the blow mold cavity from the end opposite that through which the core rod projects, and with the tube in axial alignment with the core rod and slightly larger than the cross section of the parison.

The tube prevents radial expansion of the parison but permits it to elongate when the blowing operation starts. As the blowing operation continues, the tube is withdrawn from the blowing mold and the parison expands progressively starting from the neck end of the core rod.

The invention requires a different blowing mold, but different molds are required for every different container anyway. The novel mold of this invention has simple apparatus for withdrawing the tube from the mold and it can be added to conventional blow molding machines.

Other objects, features and advantages of the invention will appear or be pointed out as the description proceeds.

In the drawing, forming a part hereof, in which like reference characters indicate corresponding parts in all the views.

Figure 2:
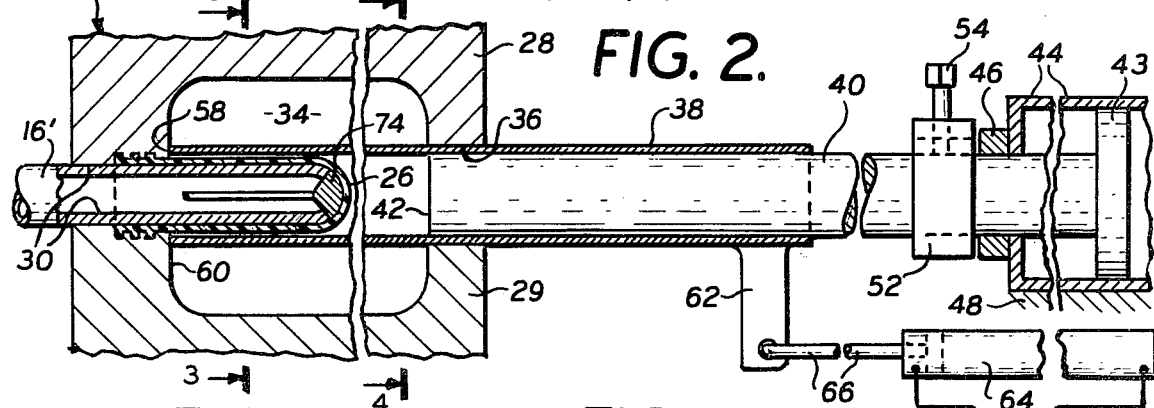
FIG. 2 is a diagrammatic sectional view showing the novel mold and confining tube of this invention.
Figure 3:
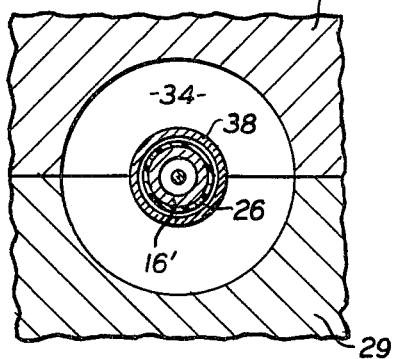
Figure 4:
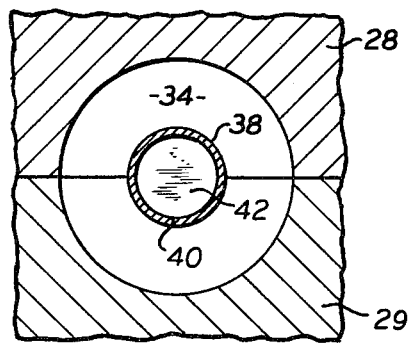
Figure 5:
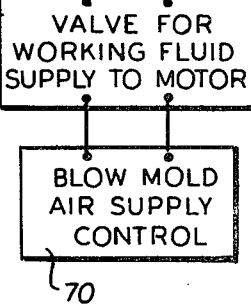
Figure 5:
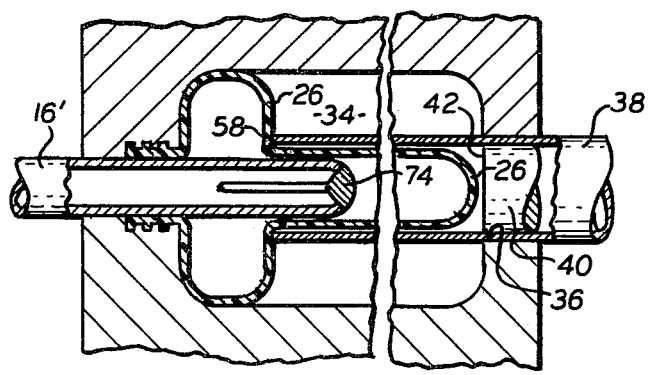
Figure 6:
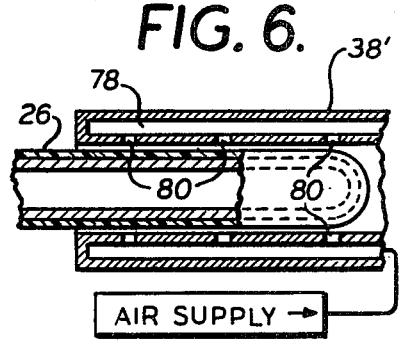

FIGS. 3 and 4 are sectional views taken on the line 3—3 and 4—4, respectively, of FIG. 2;

FIG. 5 is a fragmentary view, similar to FIG. 2, showing the blowing of the parison as the tube withdraws from the blowing mold; and FIG. 6 is a detail sectional view showing a modified form of tube for confining the parison during the initial part of the blowing operation.

Figure 1:
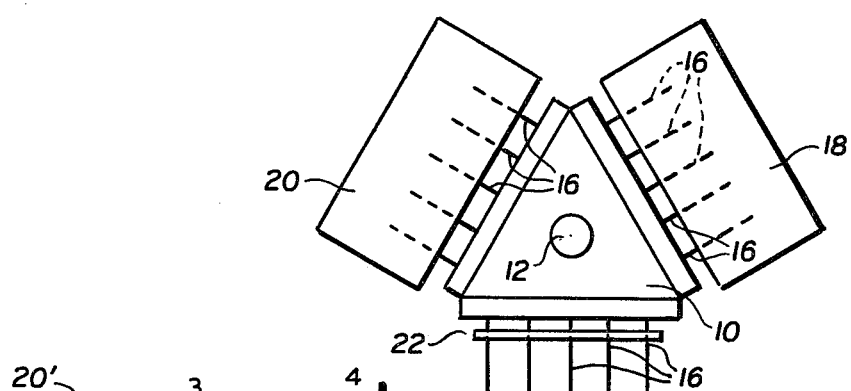
FIG. 1 is a diagrammatic top plan view showing the kind of injection blow molding apparatus with which this invention is used.

FIG. 1 shows injection blow molding apparatus including an indexing head 10 which rotates about a center shaft 12 and which has three faces from which core rods 16 extend. These core rods extend into an injection mold 18, a blowing mold 20 and to stripper mechanism 22 when the indexing head 10 is located in any one of three positions at which it stops after successive 120° angular movement.

The indexing head may have four faces or even more faces for providing additional operational stations around its perimeter. Such blow molding apparatus is well known and no further description of it is necessary for a complete understanding of this invention.

FIG. 2 shows a blowing mold 20' into which a core rod 16' extends. There is a parison 26 on the core rod 16'. The blowing mold 20' has an upper section 28 and a lower section 29 which are shown in closed position in FIG. 2. With the mold thus closed, semi-circular recesses 30 in the confronting faces of the mold sections 28 and 29 grip the core rod. These recesses 30 are also shaped to fit around the neck end of the parison 26 in accordance with conventional practice.

The cavity of the mold 20' is indicated by the reference character 34. At the end of the cavity 34 opposite the end through which the core rod 16' extends there is an opening 36 through which a tube 38 extends into the blow mold cavity 34. This tube 38 is in axial alignment with the core rod 16' and the inside diameter of the tube 38 is slightly larger than the outside diameter of the parison 26, so that there is a small clearance between the parison and the tube 38 when the tube is in the position shown in FIG. 2.

The tube 38 is movable axially in the opening 36 as a bearing. The tube 38 also slides on a shaft 40 which is preferably in a fixed position with an end face 42 in position to form, in effect, a part of the end wall of the blow mold cavity 34.

Although the shaft 40 is preferably fixed, FIG. 2 shows the shaft 40 connected to a piston 43 which slides in a cylinder 44 and through a bearing 46 secured to one end of the cylinder 44. The cylinder 44 is attached to fixed structure 48 so that as long as the piston 43 remains stationary in the cylinder, the shaft 40 is held in fixed position.

The reason for having the piston 43 and cylinder 44 is to permit the shaft 40 to be advanced toward the left so that it approaches closer to the end of the parison 26 and one technique for using this invention is to move the shaft 40 toward the right so as to create a reduced pressure ahead of the parison 26 to cause more rapid expansion of the parison in a longitudinal direction.

A collar 52 is secured in an adjustable but fixed position on the shaft 40 and locked in position by a set screw 54 so that the collar 52 strikes against the end face of the bearing 46 when the shaft 40 reaches the position shown in FIG. 2 with the end face 42 in line with the rest of the end wall of the blowing mold cavity 34.

Power means are provided for moving the tube 38 along the shaft 40 so as to shift an end wall 58 toward and from the front wall 60 of the blow mold cavity 34.

The means for moving the tube 38 includes a bracket 62 rigidly secured to the tube 38. A cylinder-and-piston motor 64 has a piston rod 66 which connects with the bracket 62 so that reciprocating movement of the piston rod 66 transmits equal movement to the tube 38. The cylinder-and-piston motor 64 is representative for means for moving the tube 38 progressively in accordance with the operation of the blow molding apparatus. FIG. 2 shows valve mechanism 68 for operating the motor 64 as a double acting motor and other control means 70 operate the valve in accordance with the supply of air to the core rod 16' at the blowing mold 20'.

At the beginning of the blowing operation, a valve 74 at the end of the core rod opens to permit air to flow from the core rod into contact with the parison 22. The pressure of this air expands the parison 26 longitudinally while the tube 38 prevents the parison from expanding radially. The clearance between the outside of the parison 26 and the inside surface of the tube 38 provides an air cushion so that as the parison 26 begins to expand it can be confined by the tube 38 without having the parison actually come in contact with the outside wall of the tube. This is advantageous so that progressive withdrawal of the tube from the mold cavity will not tend to drag on the outside surface of the parison.

At the beginning of the blowing operation, the tube 38 has its end face 58 against the front wall 60 of the blowing mold cavity 34. As the blowing operation progresses with the parison 26 expanding longitudinally toward the end face 42 of the shaft 40, the motor 64 starts to operate and to move the tube 38 toward the right so that it withdraws progressively from the blow mold cavity 34. This movement of the tube 38 is preferably delayed until the end of the parison 26 reaches, or almost reaches, the face 42 of the shaft 40.

FIG. 5 shows the tube 38 partially withdrawn from the blow mold cavity 34. As the end face 58 moves toward the right in FIG. 5, the parison 26 is unconfined for progressively greater distances toward the right and these unconfined portions of the parison 26 expand radially into contact with the wall of the blow mold cavity 34, as shown in FIG. 5. Thus the parison 26, which has been blown to substantially its full length, now expands radially to its full width and thus produces a blown container of substantially greater length than the core rod 16'.

FIG. 6 shows a modified tube 38'. This tube differs from the tube 38 shown in FIGS. 2-5 in that it has a double wall enclosing a chamber 78 into which air is supplied with enough pressure to provide an effective air cushion between the parison 26 and the inside surface of the tube 38'. The air from the chamber 78 discharges through openings 80 in the inner wall of the tube 38'. This provides an effective air cushion for operations where the blowing time is somewhat longer than with the construction shown in FIG. 5. The tube 38', however, operates in the same way as the tube 38 insofar as its movement into and out of the blow mold cavity are concerned. The tube 38' also has the shaft 40 extending into it in the same way as already described in connection with FIGS. 2-5.

The preferred embodiment of the invention has been illustrated and described, but some features can be used in different combinations without departing from the invention as defined in the claims.

What is claimed is:

1. A method for injection blow molding a container having a substantially greater length than diameter comprising;
   (a) injection molding a parison on a core rod;
   (b) providing a blow mold comprising a tube being formed with a substantially greater length longer than diameter cavity, said tube being disposed about the parison and core rod;
   (c) providing an air flow between the tube and the parison to maintain a clearance between the parison and the tube;
   (d) first blowing the parison to increase the length to diameter ratio of the parison so that said parison length approaches the length of the container being formed; and then
   (e) final blowing the parison while progressively withdrawing the tube with the progressive blowing of the parison to the final diameter of the container.

2. The method of claim 1, wherein the step of blowing the parison further comprises progressively blowing the diameter of the container from the top to the bottom of the container.

3. The method of claim 1, further comprising providing an air cushion between the inside surface of the tube and the outside of the parison.

4. The method of claim 3, further comprising controlling the pressure of the air in expanding the parison while controlling the pressure of the air cushion.

5. A method for injection blow molding a container having a substantially greater length than diameter comprising;
   (a) injecting a parison having a neck and a body portion on a core rod in an injection mold;
   (b) transfering the parison and core rod from an injection mold to a blow mold comprising a tube;
   (c) inserting the parison and core rod into the tube within the blow mold, said tube being formed with a substantially greater length than diameter cavity;
   (d) increasing the length of the parison in the tube by first blowing the parison in the tube; while preventing contact between the inside of the tube and the outside of the parison; and then
   (e) progressively withdrawing the tube while blowing the parison body so as to progressively blow the diameter of the parison from below the neck to the bottom of the blown container.

6. The method of claim 5, further comprising maintaining a clearance between the inside of the tube and the outside of the parison.

7. The method of claim 6, further comprising providing an air cushion between the inside surface of the tube and the outside of the parison.

8. The method of claim 5, further comprising terminating the withdrawal of the tube so that the end of the tube is at substantially the end of the blow mold cavity and being the end of the tube about flush with an a abutment surface.

9. The method of claim 8, further comprising timing the withdrawal of the tube in relation to completion of the blowing of the parison.

10. The method of claim 9, further comprising varying the speed of the tube withdrawal in said time relationship.

11. The method of claim 5, wherein the step of inserting the parison and core rod in the tube comprises aligning the parison and core rods to be substantially coaxial with the tube.

* * * * *